(12) United States Patent  (10) Patent No.: US 8,739,124 B2
Ritter et al.  (45) Date of Patent: May 27, 2014

(54) CONFIGURING INTEGRATION CAPABILITIES FOR SYSTEM INTEGRATION

(75) Inventors: Daniel Ritter, Walldorf (DE); Manuel Holzleitner, Walldorf (DE)

(73) Assignee: SAP AG, Walldorf (DE)

( * ) Notice: Subject to any disclaimer, the term of this patent is extended or adjusted under 35 U.S.C. 154(b) by 183 days.

(21) Appl. No.: 13/534,504

(22) Filed: Jun. 27, 2012

(65) Prior Publication Data

US 2014/0007051 A1 Jan. 2, 2014

(51) Int. Cl.
*G06F 9/44* (2006.01)
*G06F 9/45* (2006.01)

(52) U.S. Cl.
USPC ........... 717/121; 717/100; 717/101; 717/102; 717/126; 717/136; 717/174

(58) Field of Classification Search
CPC ............... G06F 8/10; G06F 8/20; G06F 8/36; G06F 8/38; G06F 8/71
See application file for complete search history.

(56) References Cited

U.S. PATENT DOCUMENTS

| | | |
|---|---|---|
| 4,714,995 A | 12/1987 | Materna et al. |
| 5,216,592 A | 6/1993 | Mann et al. |
| 5,634,127 A | 5/1997 | Cloud et al. |
| 5,701,423 A | 12/1997 | Crozier |
| 5,721,912 A | 2/1998 | Stepczyk et al. |
| 5,734,837 A | 3/1998 | Flores et al. |
| 5,778,373 A | 7/1998 | Levy et al. |
| 5,870,605 A | 2/1999 | Bracho et al. |
| 5,870,765 A | 2/1999 | Bauer et al. |
| 5,873,096 A | 2/1999 | Lim et al. |
| 6,052,684 A | 4/2000 | Du |

(Continued)

FOREIGN PATENT DOCUMENTS

| | | |
|---|---|---|
| EP | 0 592 045 | 4/1994 |
| EP | 1 217 515 | 6/2002 |

(Continued)

OTHER PUBLICATIONS

Wayne Citrin et al., Using Formalized Temporal Message-flow Diagrams, 1995, [Retrieved on Nov. 14, 2013]. Retrieved from the Internet: <URL: http://onlinelibrary.wiley.com/doi/10.1002/spe.4380251205/pdf> 35 Pages (1368-1401).*

(Continued)

*Primary Examiner* — Don Wong
*Assistant Examiner* — Anibal Rivera
(74) *Attorney, Agent, or Firm* — Fish & Richardson P.C.

(57) ABSTRACT

Configuring integration capabilities includes: receiving a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point; receiving, using one or more processors, input comprising at least one configuration point value for the configuration point, the configuration point value having been selected based on first and second systems to be integrated using the message flow; determining whether the received configuration point value violates the constraint and if so requesting another configuration point value from the input; and generating a configuration stencil instance based on the configuration stencil and the input, the configuration stencil instance representing the message flow in an integration of the first and second systems.

20 Claims, 13 Drawing Sheets

(56) References Cited

U.S. PATENT DOCUMENTS

| | | | |
|---|---|---|---|
| 6,226,649 B1 | 5/2001 | Bodamer et al. | |
| 6,256,676 B1 | 7/2001 | Taylor et al. | |
| 6,324,492 B1 | 11/2001 | Rowe | |
| 6,339,795 B1 | 1/2002 | Narurkar et al. | |
| 6,381,601 B1 | 4/2002 | Fujiwara et al. | |
| 6,446,092 B1 | 9/2002 | Sutter | |
| 6,507,856 B1 | 1/2003 | Chen et al. | |
| 6,523,027 B1 | 2/2003 | Underwood | |
| 6,571,246 B1 | 5/2003 | Anderson et al. | |
| 6,748,402 B1 | 6/2004 | Reeves et al. | |
| 6,795,868 B1 | 9/2004 | Dingman et al. | |
| 6,817,008 B2 | 11/2004 | Ledford et al. | |
| 7,051,071 B2 * | 5/2006 | Stewart et al. | 717/136 |
| 7,461,091 B2 | 12/2008 | Schneider et al. | |
| 7,716,630 B2 | 5/2010 | Wholey et al. | |
| 7,831,453 B2 | 11/2010 | Das et al. | |
| 8,332,807 B2 * | 12/2012 | Finlayson et al. | 717/101 |
| 8,539,437 B2 * | 9/2013 | Finlayson et al. | 717/101 |
| 2002/0095653 A1 | 7/2002 | Parr et al. | |
| 2002/0107752 A1 | 8/2002 | Rivera et al. | |
| 2005/0222851 A1 | 10/2005 | Dubey et al. | |
| 2006/0282458 A1 | 12/2006 | Tsyganskiy et al. | |
| 2007/0078525 A1 | 4/2007 | Chand | |
| 2007/0152044 A1 | 7/2007 | Hirth et al. | |
| 2007/0226038 A1 | 9/2007 | Das et al. | |
| 2007/0244910 A1 | 10/2007 | Mital et al. | |
| 2007/0288885 A1 | 12/2007 | Brunel et al. | |
| 2007/0299704 A1 | 12/2007 | Wildhagen et al. | |
| 2008/0216072 A1 | 9/2008 | Schneider et al. | |
| 2008/0256505 A1 * | 10/2008 | Chaar et al. | 717/100 |
| 2008/0256506 A1 * | 10/2008 | Chaar et al. | 717/101 |
| 2008/0256507 A1 * | 10/2008 | Chaar et al. | 717/101 |
| 2008/0256516 A1 * | 10/2008 | Chaar et al. | 717/121 |
| 2008/0256529 A1 * | 10/2008 | Chaar et al. | 717/174 |
| 2009/0055795 A1 * | 2/2009 | Finlayson et al. | 717/101 |
| 2009/0300586 A1 * | 12/2009 | Bernardini et al. | 717/126 |
| 2010/0017782 A1 * | 1/2010 | Chaar et al. | 717/101 |
| 2010/0023921 A1 * | 1/2010 | Chaar et al. | 717/102 |
| 2010/0031226 A1 * | 2/2010 | Chaar et al. | 717/101 |

FOREIGN PATENT DOCUMENTS

| | | |
|---|---|---|
| WO | 93/04436 | 3/1993 |
| WO | 00/79408 | 12/2000 |
| WO | 01/27806 | 4/2001 |
| WO | 02/091240 | 11/2002 |

OTHER PUBLICATIONS

Wenhsyong Lin et al., A Constrain-Driven Solid Modeling Open Environment, 1993, [Retrieved on Nov. 14, 2013]. Retrieved from the internet: <URL: http://dl.acm.org/citation.cfm?id=164429> 10 Pages (233-242).*

'Copying Control' [online] SAP, 2004, [retrieved on Jul. 17, 2009]. Retrieved from the Internet: <URL: http://sap.com/saphelp_47x200/helpdata/en/dd/560ecf545a11d1a702000e829fd11/fr>, 1 page.

Central PI monitoring and alerting' [online]. SAP AG, 2011, [retrieved on Jun. 25, 2012]. Retrieved from the Internet: <URL: http://www.sdn.sap.com/irj/scn/go/portal/prtroot/docs/library/uuid/104677d9-fc8c-2e10-dc92-c4e660b0dd8c?QuickLink=index&overridelayout=true&51556787604376, 20 pages.

Configuration management at massive scale: System design and experience' [online]. USENIX Association, 2007, [retrieved on Jun. 25, 2012]. Retrieved from the Internet: <URL: http://static.usenix.org/event/usenix07/tech/full_papers/enck/enck.pdf>, pp. 73-86.

Ench et al., Configuration management at massive scale: system design and experience, *IEEE Journal on Selected Areas in Communications*, 2009, 27(3): 323-335.

Gray et al., The Dangers of Replication and a Solution, ACM SIGMOD Record, Jun. 1996, pp. 173-182.

http://www.metamatrix.com/products/modeler.html; "Metabase Modeler: Metamatrix Creating Possibilities"; pp. 1-3; (Feb. 21, 2005).

http://www-306.ibm,com/software/awdtools/developer/datamodeler/features; "IBM Rational Rose Data Modeler"; pp. 1-2; (Feb. 21, 2005).

Huston et al., Disconnected Operation for AFS, Proceedings of the USENIX Mobile and Location-Independent Computing Symposium, Cambridge, MA, Aug. 2, 1993, USENIX Association, pp. 1-10.

OCL support in an industrial environment' [online] Altenhofen et al., 2006, [retrieved on Jun. 25, 2012]. Retrieved from the Internet: <URL: http://st.inf.tu-dresden.de/OCLApps2006/topic/acceptedPapers/03_Altenhofen_OCLSupport.pdf>, 14 pages.

Regular expression' [online] Wikipedia, 2011, [retrieved on Jun. 25, 2012]. Retrieved from the Internet: <URL: http://en.wikipedia.org/w/index.php?title=Regular_expression&oldid=430096004>, 11 pages.

SAP AG, "SAP Best Practices—Empties Processing (G66) Building Block Configuration Guide," *SAP AG*, Walldorf, Germany, 2004, 42 pages.

Sun et al., "Data flow modeling and verification in business process management," Proceedings of the Americas Conference on Information Systems, New York, New York, Aug. 2004, pp. 464-473.

The SmartFrog configuration management framework' [online]. Goldsack et al., 2009, [retrieved on Jun. 25, 2012]. Retrieved from the Internet: <URL: http://wiki.smartfrog.org/wiki/download/attachments/1311175/smartfrog_acm_sigops_osr_paper.pdf>, 10 pages.

Urban, S.D., et al., Interconnection of Distributed Components: An Overview of Current Middleware Solutions, Journal of Computing and Information Science in Engineering, vol. 1, Mar. 2001, pp. 23-31.

www.filenet.com; "FileNet Business Process Manager & Rules Engine Integration"; pp. 1-7; (Aug. 2003).

www.metamatrix.com; "Metamatrix, Metabase Modeler—Metadata Modeling Environment"; 2 pages (published no later than May 18, 2005, see accompanying information disclosure statement).

* cited by examiner

```
400
<route id="IDOC2Soap_servlet">
    <from
url="servlet:///CRM/SOO/CRMXIF_PARTNER_SAVE_M_TO_BUSINESS_PAR
TNER_SERVICE
" />
        <process ref = "parseSapRMSoapRequest" />
        <process ref = "removeSoapEnvelope" />
        <process ref = "parseIDocXmlRequest" />

<to url="pimap://
com.sap.xi.tf_CRMXIF_PARTNER_SAVE_M_TO_BUSINESS_PARTNER_SERV
ICE_?valueMappingXml=value_mapping.xml" />

<Process ref="soapOutboundRequest" />

<setHeader headerName="Authorization">
            <simple>Basic X3g3eYYYYYYYYYYYMg==</simple>
        </setHeader>

<setHeader headerName="Content - Type">
            <constant>text/xml</constant>
        </setHeader>

<setHeader headerName="CamelHttpCharacterEncoding">
            <constant>UTF-8</constant>
        </setHeader>

<setHeader headerName="CamelHttpMethod">
            <constant>POST</constant>
        </setHeader>
        <to
url="https://example.com/sap/bc/srt/scs/sap/businesspartnerre
plicationin?proxyHost=proxy.corp&proxyPort=8080&authM
ethod=Basic&authUsername=ExampleUser&authPassword=Exa
mplePassword&throwExceptionOnFailure=true" />

<process ref="createIDocXmlResponse" />
        <process ref = "soapOutboundRequest" />
    </route>
```

Integration Content:

Integration Configuration:
<bold>

FIG. 4

```xml
500
<route id="IDoc2Soap_servlet">
<from
url="servlet:///CRM/SOO/CRMXIF_PARTNER_REL_SAVE_M_TO_BUSINESS
_PARTNER_RELATIONSHIP" />
        <process ref="parseSapRMSoapRequest" />
        <process ref="removeSoapEnvelope" />
        <process ref="parseIDocXmlRequest" />

< to url="pimap://
com.sap.xi.tf._CRMXIF_PARTNER_REL_SAVE_M_TO_BUSINESS_PARTNER_
RELATIONSHIP_?valueMappingXml= value_mapping.xml" />

<process ref="soapOutboundRequest" />

<setHeader headerName="Authorization">
            <simple> Basic X3g3eXXXXXXXXXxMg==</simple>
        </setHeader>

<setHeader headerName="Content - Type">
            <constant>text/xml</constant>
        </setHeader>

<setHeader headerName="CamelHttpCharacterEncoding">
            <constant>UTF-8</constant>
        </setHeader>

<setHeader headerName="CamelHttpMethod">
            <constant>POST</constant>
        </setHeader>

<to
url="https://example.com/sap/bc/srt/scs/sap/businesspartnerre
lationshiprep?sap-
vhost=example.com?proxyHost=proxy.corp&proxyPort=8080&
; authMethod=Basic&authUsername=ExampleUser&authPasswo
rd=ExamplePassword&throwExceptionOnFailure=true" />

<process ref="createIDocXmlResponse" />
            <process ref="soapOutboundRequest" />
        </route>
```

```
<route id="IDoc2Soap_servlet ">
<from url="servlet://{{ "servlet}}" />
    <process ref="parseSapRMSoapRequest" />
    <process ref="removeSoapEnvelope" />
    <process ref="parseIDocXmlRequest" />

<to url="plmap:/{{plmap.name}}?valueMappingXml=
{{valueMappingXml}}" />

<process ref="soapOutboundRequest" />

<setHeader headerName="Authorization">
        <simple>{{sod.authorization}}</simple>
    </setHeader>

<setHeader headerName="Content-Type">
        <constant>text/xml</constant>
    </setHeader>

<setHeader headerName="CamelHttpCharacterEncoding">
        <constant>UTF-8</constant>
    </setHeader>

<setHeader headerName="CamelHttpMethod">
        <constant>POST</constant>
    </setHeader>

<to
url="{{sod.url}}?proxyHost={{proxy.host}}&proxyPort={{pro
xy.port}}&authMethod={{auth.method}}&authUsername={{s
od.username}}&authPassword={{sod.password}}&throwExce
ptionOnFailure={{exception.on.failure}}" />

<process ref="createIDocXmlResponse" />
    <process ref="soapOutboundRequest" />
</route>
```

602 — Content Constraints

602 — Type Constraints: String, Integer

Configuration Point: {{...}}

FIG. 6

Create instance from Stencil for Business Partner

700 — sod.authorization=Basic X3g3eDpzYYYYYYYYYYY==
sod.username=ExampleUsername
sod.password=ExamplePassword
sod.url=https://example.com/sap/bc/srt/scs/sap/businesspartnerreplicatio nin?sap-vhost=example.com proxy.port=8080
proxy.host=proxy.corp
auth.method=Basic
exception.on.failure=true servlet=/CRM/SOD/CRMXIF_PARTNER_SAVE_M_TO_BUSINESS_PARTNER_S ERVICE
pimap.name=com.sap.xi.tf._CRMXIF_PARTNER_SAVE_M_TO_BUSINESS_PA RTNER_SERVICE_ valueMappingXml=value_mapping.xml

Create instance from Stencil for Business Partner Relationship

702 — sod.authorization=Basic X3g3eXXXXXXXxMg---
sod.username=ExampleUsername
sod.password=ExamplePassword
sod.url=https://example.com/sap/bc/srt/scs/sap/businesspartnerrelations hiprep?sap-vhost=example.com proxy.port=8080
proxy.host=proxy.Corp
auth.method=Basic
exception.on.failure=true servlet=/CRM/SOD/CRMXIF_PARTNER_REL_SAVE_M_TO_BUSINESS_PARTN ER_RELATIONSHIP
pimap.name=com.sap.xi.tf._CRMXIF_PARTNER_REL_SAVE_M_TO_BUSINES S_PARTNER_RELATIONSHIP_ valueMappingXml=value_mapping.xml

CONFIGURING INTEGRATION CAPABILITIES FOR SYSTEM INTEGRATION

BACKGROUND

In some of today's complex computer systems, applications are expected to leverage linked data within their domain and across different domains. Therefore, these application programs cannot only work on local data, but need query mechanisms to the distributed data. For data that is "hidden" within the different domains, (remote) queries are sometimes formulated and executed on that data. The technical systems therefore need message-based integration capabilities on middleware, or embedded integration capabilities.

However, application developers focus on complex domain problems and may not have sufficient or even any knowledge in the integration domain. Integration developers or architects are sometimes tasked to define message flows without knowing the concrete application domain. This can lead to a gap between integration and application. While integration experts are able to define or maintain already existing routes, the application developers are usually the ones who know the concrete, application-specific integration configuration. Such a situation can be found in many middleware and embedded integration solutions.

The current solutions are either to train the application developers to do the message flow definition and integration configuration themselves or to specify their requirements to the integration experts. This process can be error-prone and/or generate an overhead on the organization, especially when it comes to simple, point-to-point messaging. Even if application experts have sufficient integration knowledge, the experts sometimes do not comply with policies of the organization or best practices. For example, such failure to comply can raise issues regarding security, quality of service regulations, endpoint specifications, idempotent receiver configuration, etc.

SUMMARY

In a first aspect, a computer-implemented method for configuring integration capabilities for system integration includes: receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point; receiving, using one or more processors, input comprising at least one configuration point value for the configuration point, the configuration point value having been selected based on first and second systems to be integrated using the message flow; determining whether the received configuration point value violates the constraint and if so requesting another configuration point value from the input; and generating a configuration stencil instance based on the configuration stencil and the input, the configuration stencil instance representing the message flow in an integration of the first and second systems.

In a second aspect, a computer program product embodied in a non-transitory computer-readable storage medium comprises instructions that when executed by a processor perform a method including: receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point; receiving, using one or more processors, input comprising at least one configuration point value for the configuration point, the configuration point value having been selected based on first and second systems to be integrated using the message flow; determining whether the received configuration point value violates the constraint and if so requesting another configuration point value from the input; and generating a configuration stencil instance based on the configuration stencil and the input, the configuration stencil instance representing the message flow in an integration of the first and second systems.

In a third aspect, a system includes: one or more processors; and a computer program product embodied in a non-transitory computer-readable storage medium and comprising instructions that when executed by a processor perform a method including: receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point; receiving, using one or more processors, input comprising at least one configuration point value for the configuration point, the configuration point value having been selected based on first and second systems to be integrated using the message flow; determining whether the received configuration point value violates the constraint and if so requesting another configuration point value from the input; and generating a configuration stencil instance based on the configuration stencil and the input, the configuration stencil instance representing the message flow in an integration of the first and second systems.

Implementations can include any or all of the following features. The method further includes generating the configuration stencil from one or more existing routes. Generating the configuration stencil comprises pre-processing the one or more existing routes; identifying integration artifacts and content; deriving the at least one constraint from the identified content; identify and parse the at least one configuration point; performing analysis and apply the at least one constraint; and replacing one or more concrete values with the at least one configuration point and deploy the configuration stencil. The method further includes performing lifecycle management of the configuration stencil including versioning. The configuration stencil provides for monitoring of the message flow; wherein the configuration stencil corresponds to a design-time model in which one configuration stencil node defines one or more configuration point nodes, the design-time model providing for the configuration point node to be connected to a configuration constraint node; wherein a monitoring point node is connected to the configuration stencil node in the design-time model, the monitoring point node having a monitoring point specification; wherein the configuration stencil instance corresponds to a runtime model in which a stencil instance node is an instance of the configuration stencil node, a configuration point value node is a value for the configuration point node, the runtime model providing for the configuration point value node to be connected to a configuration point type value node; and wherein a monitoring point value node is a value for the monitoring point node, and a monitoring point query node is a value for the monitoring point specification. The first system is a sales system and the second system is a customer relationship management (CRM) system, and the configuration stencil instance configures the message flow for a business partner object in the CRM system and another configuration stencil instance generated from the configuration stencil configures a business partner relationship object in the CRM system. The method further includes providing a graphical user interface that identifies the configuration stencil, provides a first input control for generating one or more new configuration stencil instances, and provides at least a second input control for managing a lifecycle of the generated new configuration stencil instance.

Implementations can provide any or all of the following advantages. Configuration for system integration can be made more expedient. Flexible configuration for new or existing artifacts in a system, such as channels, integration flows and/or routes. An implementation can provide cross-persona usage for non-integration experts. Configuration points can be extracted automatically or defined manually. Constraints can be globally defined and best practices can be enforced (e.g., rules for integration and/or service level agreement enforcement). Configuration instances can be specified or captured (e.g., automatic content and parameterization point identification). A simple and flexible instance creation from semantic configuration annotation can be provided based on definition and capture (e.g., instances of configuration stencils can be created with regard to constraints and parameterization information). Constraints can be enforced (e.g., on integration entities, based on ontologies over the integration specification). Configuration definitions can be exchanged or reused via configuration stencil store and partner content development (e.g., integration-as-a-service configuration with cloud and on-premise applications). A database-centric and domain agnostic implementation can be provided that does not require an application stack, but only storage and integration middleware, such that it is applicable across development units.

The details of one or more implementations are set forth in the accompanying drawings and the description below. Other features and advantages will be apparent from the description and drawings, and from the claims.

DESCRIPTION OF DRAWINGS

FIG. 4 shows an example of an integration flow description.

FIG. 5 shows another example of an integration flow description.

FIG. 6 shows an example of a configuration stencil created from the integration flow descriptions in FIGS. 4-5.

FIG. 7 shows an example of creating instances from the configuration stencil in FIG. 6.

FIGS. 12A-E show examples of a stencil control table corresponding to the operations in FIG. 11.

Like reference symbols in the various drawings indicate like elements.

DETAILED DESCRIPTION

This document describes systems and techniques that use one or more stencils to configure integration capabilities. For example, a stencil can indicate at least two aspects of the integration: content and configuration. Through configuration points and constraints, stencils can be flexibly adapted to arbitrary application domains and system landscapes.

Figure 1:
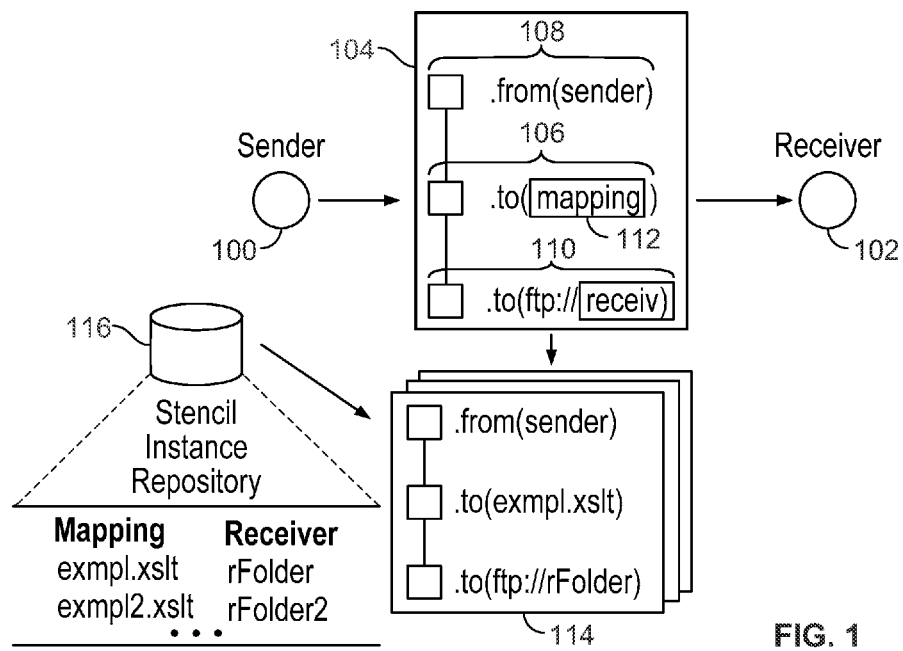
FIG. 1 schematically shows an example of creating stencil instances by defining configuration point values in a stencil instance repository.

FIG. 1 schematically shows an example of creating stencil instances by defining configuration point values in a stencil instance repository. The following example relates to a mediated message flow that involves a sender 100 and a receiver 102. An integration expert can use a configuration stencil 104 to technically configure the flow in a specific system landscape for application integration use cases. When considering these use cases, one or more intersections can be identifies that could be taken as reusable configurations for further application integration needs. For example, one application may require data from one company, and another from another company, while both require HTTP/JSON with OAuth support. If the social media by default responds in XML, then an XML-to-JSON transformation is required. However, both cases involve middleware performing the same mapping (here a .to(mapping) 106) and routing and protocol handling (here a .from(http://) 108 and a .to(file://) 110).

The integration expert builds the concrete message flow and adapts or configures it to comply with the technical characteristics of the system landscape. In doing so, the expert considers all integration-specific challenges and best practices in the field or in the company. For example such practices can involve idempotent receiving, quality-of-service level, organization policies or security policies.

That is, the integration expert here uses the same route pattern for at least two use cases, perhaps in different runtime instances, and a configuration has to be applied for each of them. The stencil 104 captures the route pattern and provides for enhancement by one or more configuration points 112. That is, the expert creates the stencil 104 with a stencil API that allows for adding concrete configuration values as parameters to define particular configuration points in the message flow. For these configuration points, best practices, guidelines and constraints can be added. This can be done manually or via tool support, to be described in an example below.

In some implementations, the configuration points 112 are bound to a type, such as string, integer or complex type. This is sometimes referred to as a type constraint. One or more additional constraints can be assigned to the configuration point, for example that a value is a valid URL or that a value is in a specific port range, to name just two examples. In some implementations, the configuration point 112 has a default value that is used when no other value is specific, and can then be considered an optional configuration point. In other implementations, the configuration point 112 initially has an undefined or null value, meaning that the value must be configured for a specific scenario, which can be considered a required configuration point.

The stencil 104 is made available to application developers or administrators for use in their domains. The stencil includes the content that is delivered to customers, and the stencil can be shared between customers. Continuing the above example, another application that needs to access a business information service for company data, can pick and choose the stencil and configure the points adapted to its domain. Therefore, only domain knowledge and no integration knowledge is required. With that, composition of stencils is also feasible.

More concretely, the application developer creates one or more configuration stencil instances 114, which is a concrete message flow, and defines concrete values for the configuration point(s) 112 in the stencil. The stencil instance 116 is the configuration that is configured by the user for a specific scenario. This is done in a separate configuration container, while following the constraints defined in the stencil. This can be supported by, for example, object constraint language, auto completion, and/or other tools. Here, for example, a stencil instance repository 116 is used, which can be any suitable storage. In some implementations, the repository 116 includes at least one database table.

Figure 2:
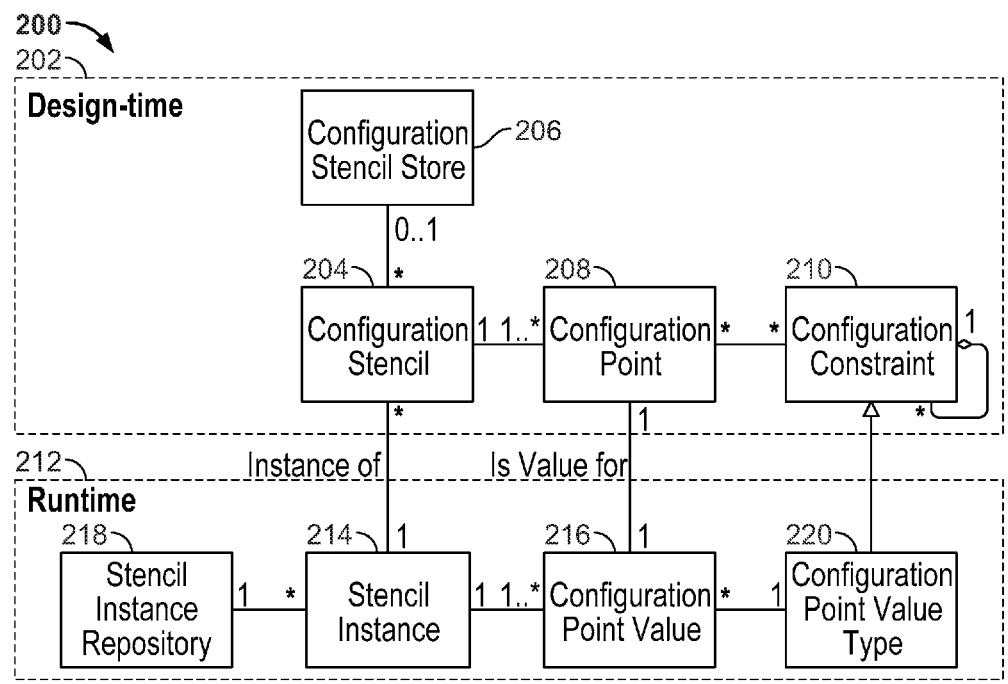
FIG. 2 shows an example of a model that illustrates relationships between configuration stencil artifacts.

FIG. 2 shows an example of a model 200 that illustrates relationships between configuration stencil artifacts. Each of a design-time model 202 and a runtime model 212 includes multiple nodes. In the design-time model 202, a configuration stencil 204 may or may not be part of a configuration stencil store 206. The configuration stencil 204 defines one or more configuration points 208 which are connected to none to many configuration constraints 210. For example, a constraint for a configuration point can be value type, which defines that the configuration point can only be filled with a value such as a string, integer, or complex type. In some implementations, constraints can be more complex (e.g., a regular-expression constraint for a URL), and/or constraint composition can be done.

In the runtime model 212, a stencil instance 214 is created when at least one configuration point value 216 for the configuration point(s) 208 is created in a stencil instance repository 218. For example, the stencil instance repository can be a database that holds the values for a stencil in a specific table. A configuration point value type can be any type that defines a permissible value for a configuration point.

Figure 3:
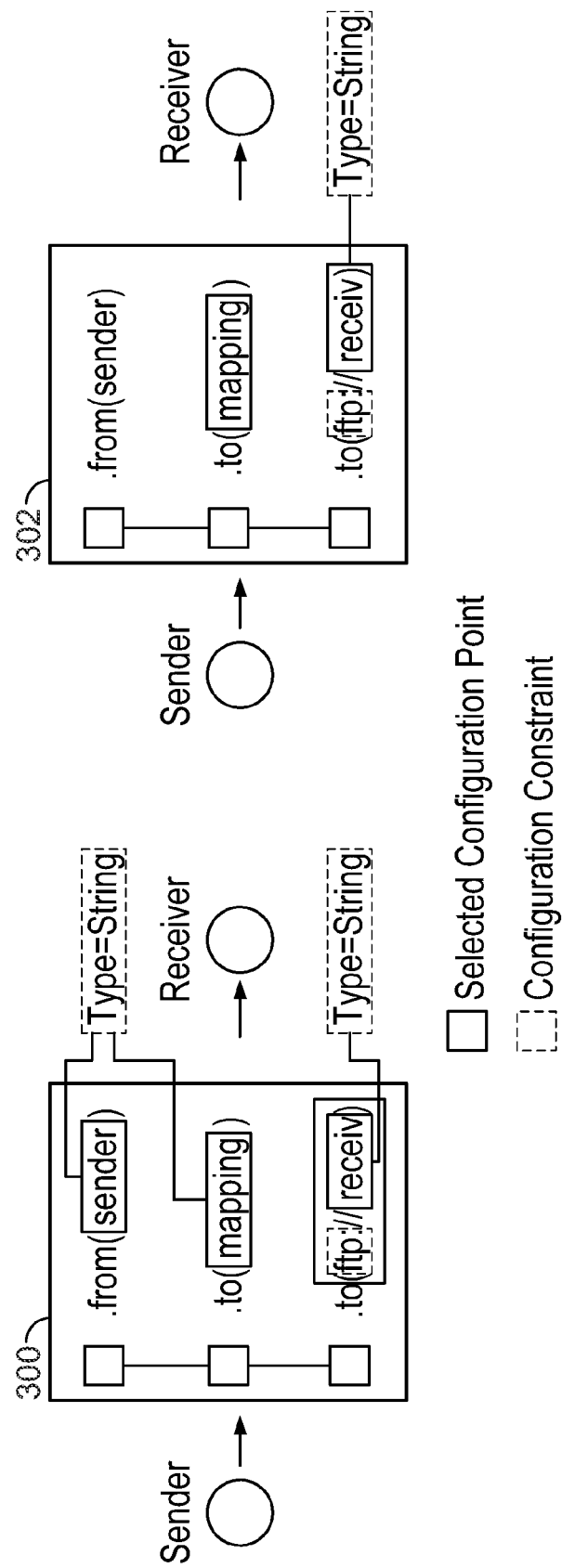
FIG. 3 shows an example of selecting and creating configuration points and constraints.

FIG. 3 shows an example of selecting and creating configuration points and constraints. In some implementations, one or more stencils can be created by a technique that is here referred to as introspection. Starting from a concrete message flow, creating stencils by introspection involves an introspection component proposing one or more possible configuration points based on a context where the message flow is being used and based on a meta-model for the configuration. In some implementations, types and constraints can be derived from the meta-model.

Here, the introspection analyzes one or more existing message flows and generates a stencil proposal 300 in which configuration points are indicated by a solid outline and configuration constraints are indicated by a dashed outline. For example, a constraint of the first two configuration points is marked as "Type=String". From the stencil proposal 300 an integration expert selects a configuration stencil 302 that here indicates configuration points and constraints.

The following is an example of a route to which introspection can be applied:

```
from("servlet://input?servletName=test")
.to("xslt://mapping.xsl?allowStAX=true")
.to(file://output?autoCreate=false)
```

That is, a configuration stencil can be generated from one or more existing routes. The following is an example algorithm for applying an introspection process to the above route:

(1) Routes are preprocessed. In some implementations, routes can be read and tokenized, for example:

```
{route parts}
(from, to, to)
{servlet, xslt, file}
{input, mapping.xsl, output}
...
```

(2) Integration artifacts and content are identified. In some implementations, "from( )" and "to( )" are route artifacts and "http://" is content representing an adapter type. For example:

```
{route parts}
Integration artifacts={from, to, to}
Content={servlet, xslt, file}
```

(3) One or more constraints are derived from the content. In some implementations, this is done by data mining documentation or by detecting facts in the code. For a servlet, for example:

```
Pattern=servlet://relative_path[?options]
Relative_path=String, regex=(a-zA-Z0-9_)*
Options=parameter=value
Parameter=(httpBindingRef|matchOnUriPrefix|servletName)
Value for httpBindingRef=String, regex=(a-zA-Z0-9_.)*
Value for matchOnUriPrefix =(true|false)
Value for servletName=String, regex=(a-zA-Z0-9_)*
```

(4) Configuration points are identified and parsed. For example, the following configuration points can be found for servlet:

```
relative_path
httpBindingRef
matchOnUriPrefix
servletName
```

(5) Constraints are analyzed and applied. For example, the introspection can propose the following hooks to the user:

```
relative_path[type=String,regexConstraint=(a-zA-Z0-9_),
uniquenessConstraint]
httpBindingRef[type=String,regexConstraint=(a-zA-Z0-9_.)]
matchOnUriPrefix[type=Boolean,default=true]
servletName[type=String,regexConstraint=(a-zA-Z0-9_),
uniquenessConstraint,default=test]
```

The user selects only the needed configuration points and applies them to the stencil. For example:

```
servletName[type=String,regexConstraint=(a-zA-Z0-9_),
uniquenessConstraint,default=test]
```

The instrumented route is deployed. In some implementations, concrete values are replaced with configuration points. For example:

```
from("servlet://input?servletName=$(servletName)")
.to("xslt://mapping.xsl?allowStAX=true")
.to("file://output?autoCreate=false")
Where $(servletName) has the constraints[type=String,regexConstraint=
(a-
zAZ0-9_), uniquenessConstraint,default=test]
```

FIG. 4 shows an example of an integration flow description 400. The flow description 400 relates to a scenario where two existing systems are analyzed for purposes of integration. The first system is a sales system and the second system is a customer relationship management (CRM) system. The sales system should be integrated with the CRM system.

The current example involves two scenarios, one involving a business partner object in the sales system and another involving a business partner relationship object in the CRM system. In the first scenario, when the business partner object is created in the sales system this information must also be available to the CRM system. That is, the sales system must send the information about the new business partner via middleware to the CRM system.

An integration developer therefore creates the integration flow description 400 which is concrete to this scenario and which is also concrete to the system landscape. For example, the integration flow description can allow the middleware to receive business partner messages from the sales system, transform the message(s) into a format the CRM system can handle, and send the message to the concrete CRM system.

In the integration flow description 400, integration content is indicated by a dashed outline and integration configuration is indicated by highlighting in bold. Such a textual representation of the integration flow description is not necessary, however. In another implementation, the integration flow can also or instead be expressed using any other model-based representation (e.g., a graphical model).

In the second scenario a business partner relationship must be sent from the CRM system to the sales system. FIG. 5 shows another example of an integration flow description 500. In this example, the integration flow description 500 is similar to the integration flow description 400 (FIG. 4). As above, integration content is indicated by a dashed outline and integration configuration is indicated by highlighting in bold. The difference is in the configuration parts.

A stencil can then be created. FIG. 6 shows an example of a configuration stencil 600 created from the integration flow descriptions in FIGS. 4-5. The stencil 600 covers both the scenarios described above and can be generated by manually or automatically applying the algorithm described above.

The configuration stencil 600 defines certain configuration points (here indicated by "{{...}}" brackets. The stencil also describes constraints 602, such as type constraints or content constraints. For example, a configuration point URL can be constrained by the type string and by a regular expression that validates the URL format. In this example, these constraints are indicated by annotation and not by inclusion in the description. Constraints can either be specified also in a textual form (e.g., the type constraints can be added to the textual definition of the configuration point (e.g., url:String), or in any other form (e.g., models) that links to the given configuration point.

FIG. 7 shows an example of creating instances from the configuration stencil 600 in FIG. 6. Here, an instance 700 is created for the business partner, and a stencil 702 is created for the business partner relationship. An application (domain) expert and/or an IT administrator can create one or more instance from a given stencil by defining values for all configuration points that are defined in the stencil. This can involve receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point. Input comprising at least one configuration point value for the configuration point can also be received, the configuration point value having been selected based on first and second systems to be integrated using the message flow. It can be determined whether the received configuration point value violates the constraint and if so another configuration point value can be requested from the input. A configuration stencil instance can then be generated based on the configuration stencil and the input, the configuration stencil instance representing the message flow in an integration of the first and second systems. The content defined in the stencil (e.g., the structure of the flow and the mapping content) combined with the configuration values then forms the instance of a stencil. How the configuration point values are defined depends on the specific implementations. For example, the values can be defined in property files in a specific folder on the file system.

Figure 8:
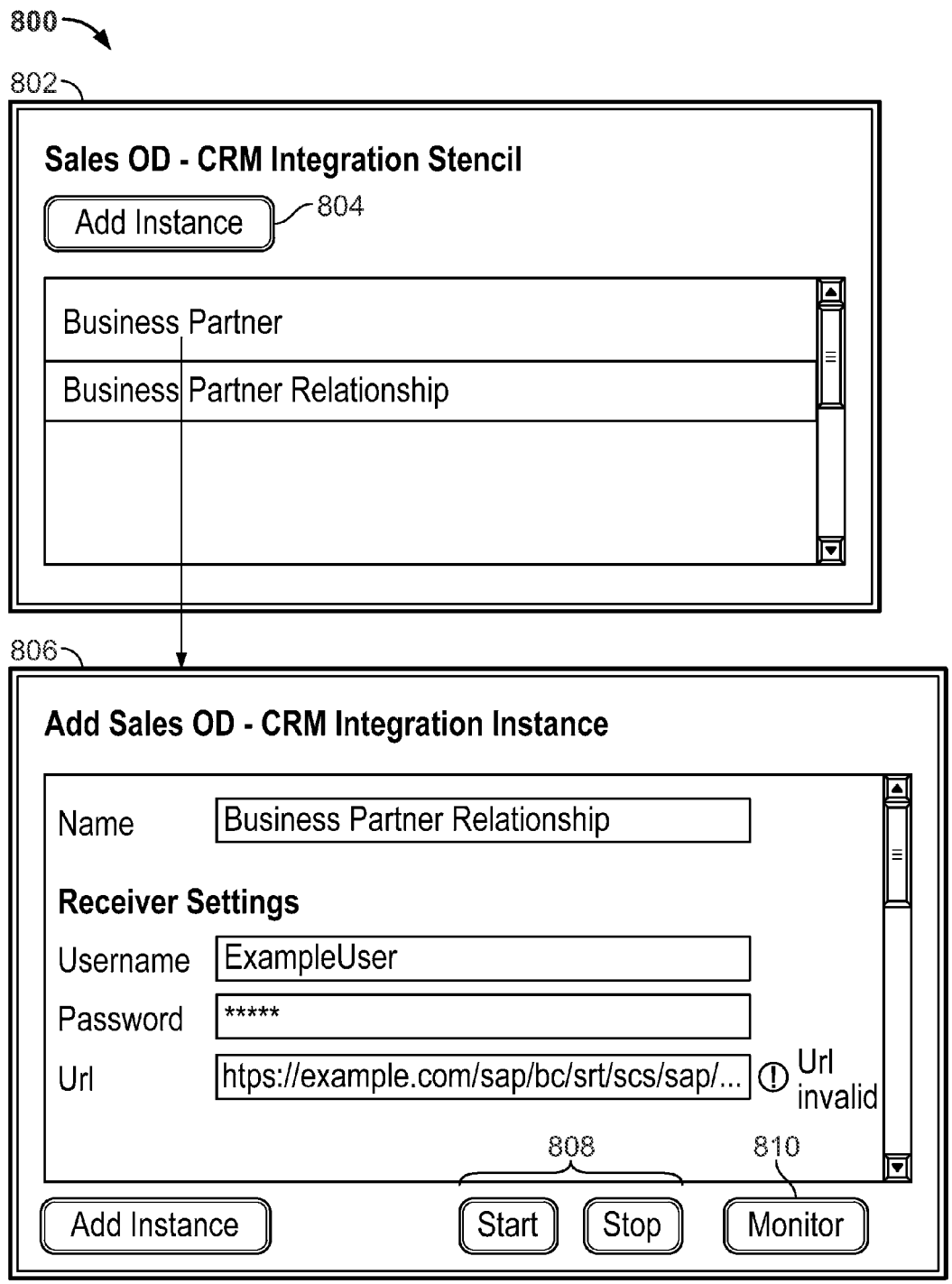
FIG. 8 shows an example of a graphical user interface for creating an instance of a configuration stencil.

Another implementation is to define one or more configuration values in a user interface. FIG. 8 shows an example of a graphical user interface 800 for creating an instance of a configuration stencil. In a first pane 802, an input control 804 is provided for generating one or more new configuration stencil instances. In a second pane 806, a second input control 808 is provided for managing the lifecycle of (e.g., starting or stopping) the generated new configuration stencil instance. As an application expert enters values in the fields the values can be validated against the constraints defined in the stencil. Specific constraints can also cause one or more other input fields to appear. For example, for configuration points of type Boolean a checkbox or other control can be used.

The instance can now be started or stopped, and managed on a middleware node, by the application expert. If a monitoring control 810 is selected, one or more monitoring points can be used for displaying data that indicates how the scenario behaves during runtime. For integration flow operations, scenario-specific monitoring points can be added to the stencil. For example, they can be used for logging the size of the message before and after the mapping. In some implementations, such monitoring also has a type, such as integer.

The following example is based on this hypothesis: A customer wants to know if integration scenarios are running correctly without any issues. The customer may not want to monitor the scenario at a fine granular message level generic for each scenario. A broader view on the scenario-specific level is required. In one scenario a user orders something in System A once a week. When the order is submitted System A sends the order to System B via an enterprise services bus (ESB). This can be done via a simple object access protocol (SOAP) call. If there monitoring is done only at a generic message-level, the ESB is only able to show an error message if System B goes down. If System A goes down no messages are received by the ESB, so from the ESB point of view the scenario is running successfully. For this particular scenario it might be necessary to add an additional monitoring route to the scenario, which monitoring pings if the sender and receiver are currently running.

A wide range of monitoring/operations functionalities may be required at a scenario-specific level, e.g., the uptime status of the sender/receiver (determined per sender/receiver ping), content-based monitoring (e.g. order IDs that went through the scenario), scenario-specific error queues, or scenario-specific metering (e.g., orders per message ratio).

A stencil can include additional components and routes needed for the monitoring and operations specific to the scenario it supports. For example, the stencil can incorporate surveillance, interceptors, statistics processor or other monitoring components into the routes. The stencil can also define routes which are only used for monitoring in the scenario, e.g. for sender/receiver pings, synchronization checks, error propagation, or semantic error detection.

Lifecycle management of a configuration stencil can be performed. In some implementations, different versioning mechanisms are possible. For example, a stencil can have a version parameter with either major, minor or micro version depending on the type of change. In some implementations, configuration points are not versioned because they are part of the stencil version. In some implementations, constraints are not versioned independently but new versions of a stencil can reference a new constraint.

The instances (and the configuration point values) of a stencil can be automatically migrates to a new stencil version if the stencil is backward compatible, for example by configuration point values if the previous version being connected to the configuration points of the new version. Manual migrations of instance to a major new version are also possible. As another example, a new version of a stencil can be treated as a new stencil without specifying a version parameter.

Figure 9:
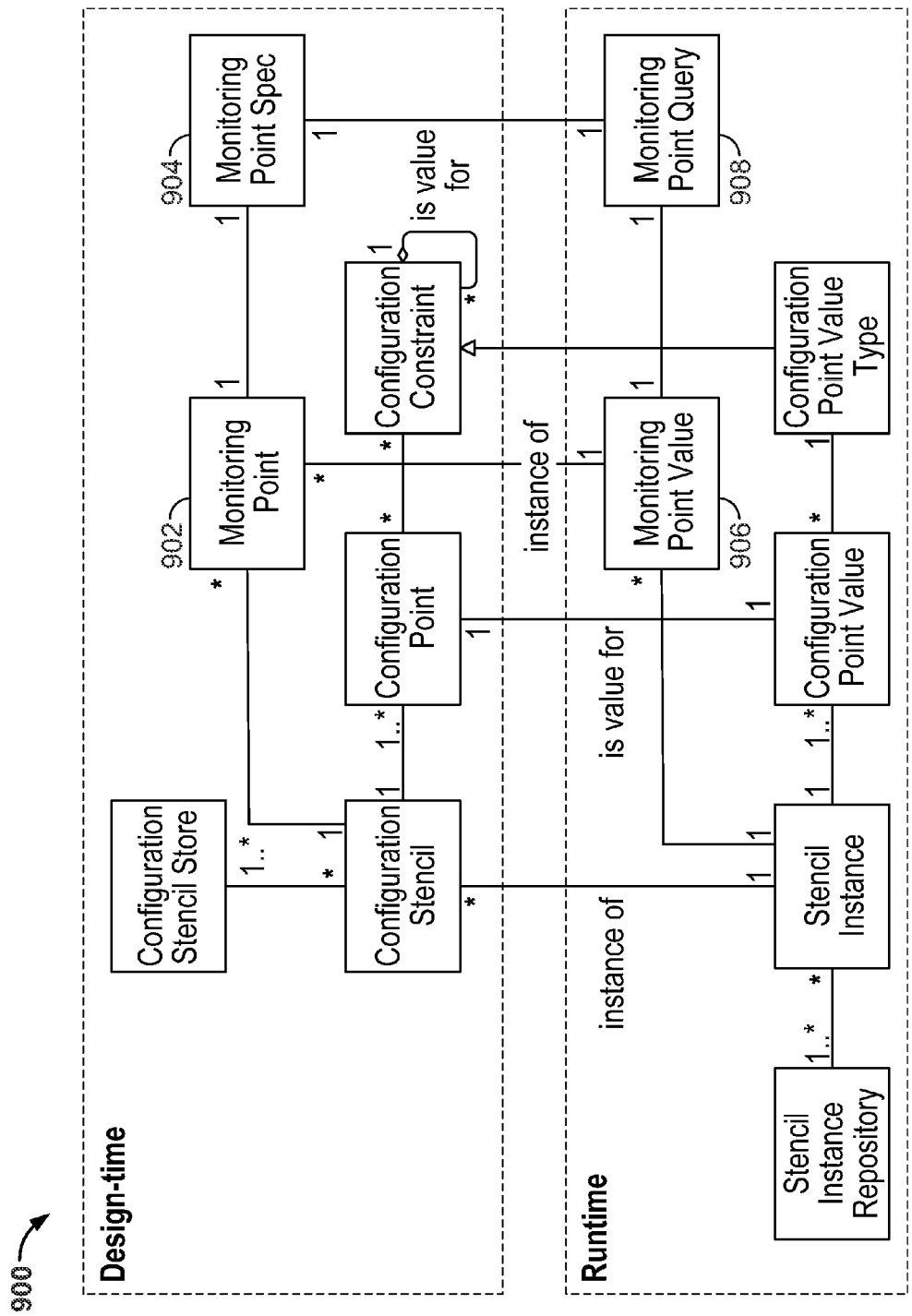
FIG. 9 shows an example of a model that illustrates relationship between configuration stencil artifacts with monitoring.

FIG. 9 shows an example of a model 900 that illustrates relationship between configuration stencil artifacts with monitoring. Some components corresponding to those described above with reference to FIG. 2 are not explicitly mentioned here. A configuration stencil has zero to many monitoring points 902. Each monitoring point 902 has one monitoring point specification 904. A monitoring point value 906 as an instance of the monitoring point 902. A monitoring point query 908 is a value for the monitoring point specification 904.

Figure 10:
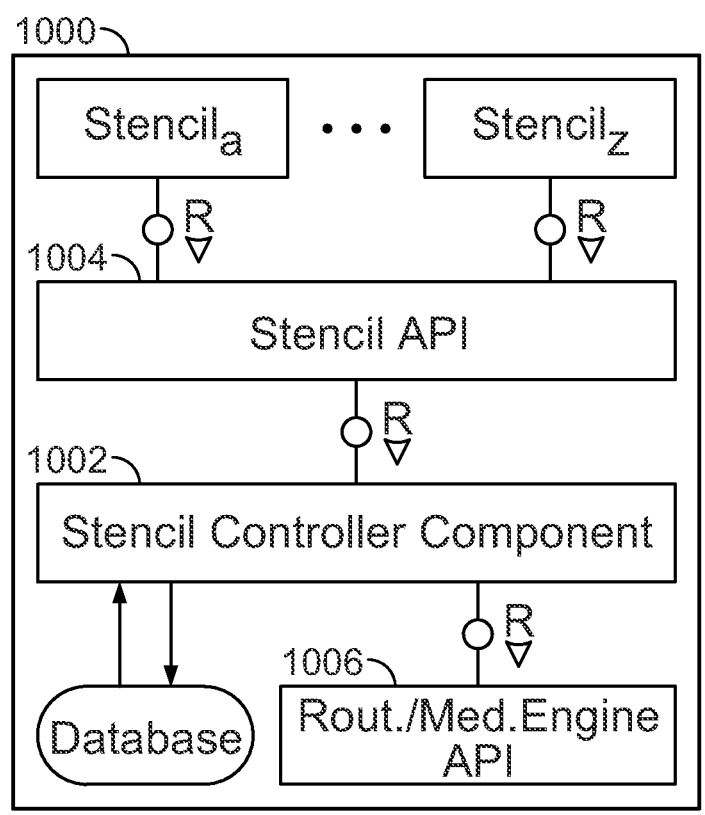
FIG. 10 shows an example of an implementation with a stencil controller.

FIG. 10 shows an example of an implementation 1000 with a stencil controller 1002. This example illustrates an implementation of the stencil approach. The stencil controller 1002 can be run as one open services gateway initiative (OSGi) bundle, which can also include a state machine to start and stop routes. A stencil API 1004 is used to develop stencils as separate bundles. A basic stencil example uses the stencil API to create routes by defining configuration points.

In this example a manual stencil development is shown. The stencil API is therefore a Java API. Another API 1006, by contrast, is an API for a routing and mediation engine. For example, this can be an Apache Camel API. A central part for configuring Camel routes with a Java API is the CamelContext, which represents a single Camel routing rulebase.

The stencil API 1004 also provides a central interface to configure stencils. The user of the API creates a stencil context with a stencil create factory method and adds routes to the context, for example in the way it is done in the Camel Java DSL. To add routes the integration expert uses the stencil route builder, which can extend from a Camel RouteBuilder, to provide functionality that is needed in the stencil context. For example, when the Camel API is modified, this modification is inherited in the stencil API 1004. With the stencil context the user creates parameters by calling a context create parameter and uses the parameters inside the route to create configuration points. In a stencil a custom Camel processor can be used inside the routes. For example, this can allow custom stencils to solve many integration problems.

In some implementations, a stencil decides how much flexibility it wants to expose by creating as many configuration points as it needs to make the stencil more flexible. A stencil can range from not flexible (e.g., by only providing a configuration point for filling in an HTTP endpoint URL) to very flexible.

The implementation 1000 is shown as including a number of stencils labeled Stencil$_a$ through Stencil$_z$. The following is an example of a stencil:

```
public class BundleActivator implements
org.osgi.framework.BundleActivator {
@Override
public void start(BundleContext arg0) throws Exception {
        System.out.println("Starting Stencil Example");
        final StencilContext stencil = Stencil.create("example");
        final StencilParameter fromDirectory =
stencil.createParameter("from_directory");
final StencilParameter toDirectory = stencil.createParameter("to_directory");
stencil.addRoutes(new StencilRouteBuilder( ){
@Override
public void configure( ) throws Exception {
        from("file://" + fromDirectory).to("file://" + toDirectory);
        }
    });
    }
@Override
public void stop(BundleContext arg0) throws Exception {
System.out.println(" Stopping Stencil Example");
Stencil.destroy("example");
    }
}
```

This stencil is loaded when the bundle is started by the stencil controller component 1002. In this example no constraints are explicitly defined by the stencil, meaning that per default all parameters are implicitly of type string and no other constraints are defined yet. In other implementations, one or more constraints can be explicitly defined by the stencil.

The stencil API 1004 is very powerful because it can embed custom Java code. Nevertheless, some integration experts may be used to graphical tools, such as an existing integration flow tool or an existing integration builder tool. Therefore, to write, build and bundle new stencil at least basic Java development knowledge and corresponding tools may be required. However, the integration flow tool can itself function as a stencil API given that injection points for stencils can be defined and assuming that the integration flow tool can generate stencils.

Having intermediate artifacts of stencils can also be compared to a generator approach, for example in on-boarding scenarios where one or more scenarios must be created for different customers and only some fields need to be changes for creating numerous specific scenarios. With stencils, reconfiguration of many routes might be easier than with a generator approach. With a generator it may be necessary to recompile and build, deploy and start a bundle for every route until the change is reflected in all routes.

Figure 11:
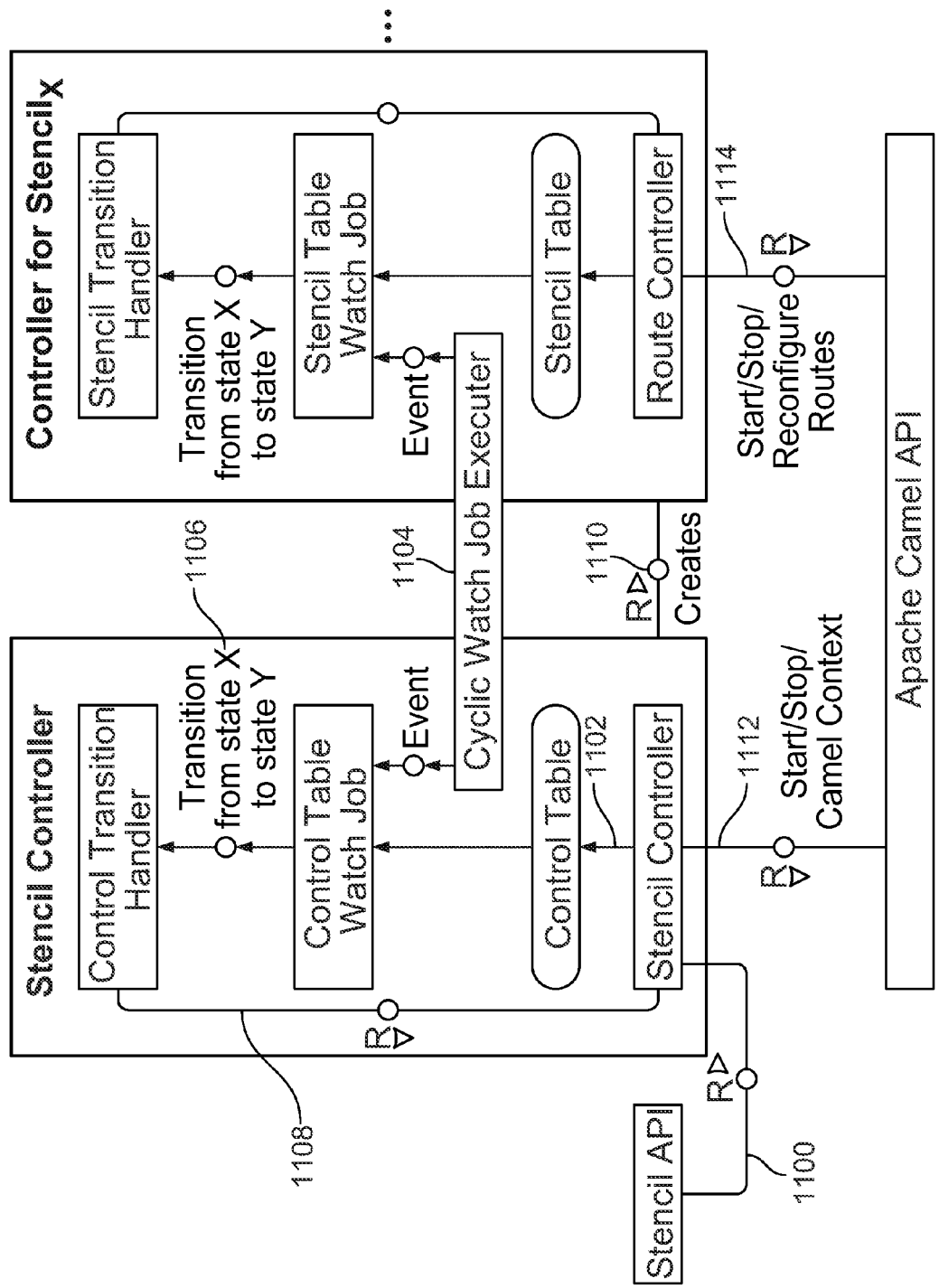
FIG. 11 shows an example of stencil controller operations.
Figures 12A, 12B, 12C:
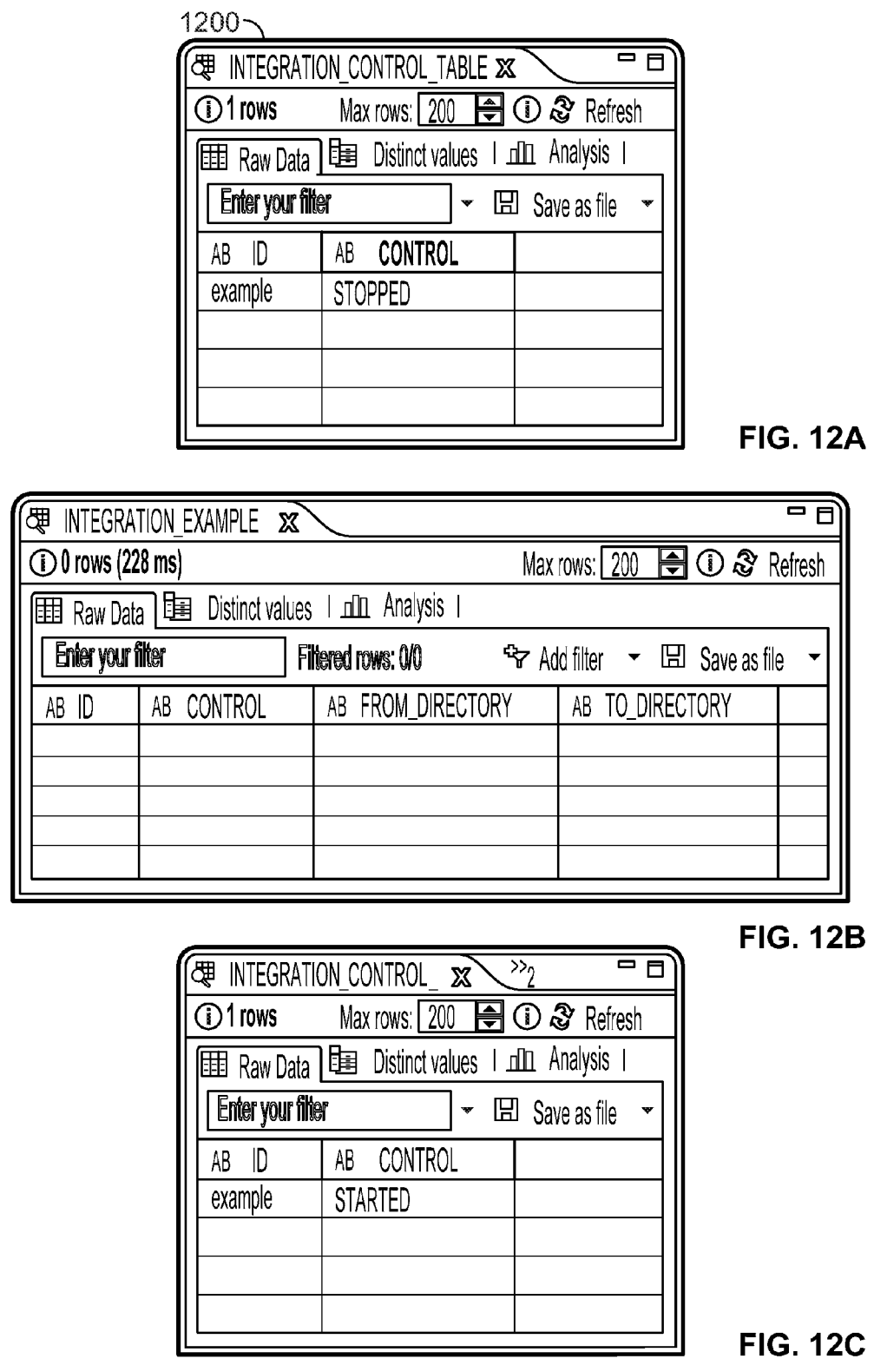
Figure 12D:
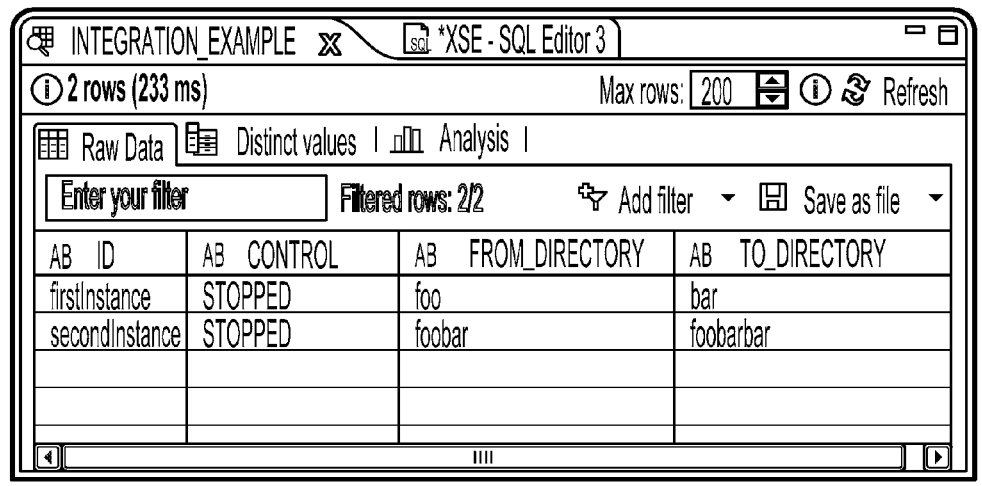

FIG. 11 shows an example of stencil controller operations. FIGS. 12A-E show examples of a stencil control table corresponding to the operations in FIG. 11. In some implementations, this example shows the behavior of the stencil controller component 1002 (FIG. 10). At 1100, when the bundle that contains the stencil starts, it calls the stencil controller to create a new stencil. At 1102, when a stencil is created the stencil controller inserts a new row into a stencil control table and sets the state of the stencil to STOPPED. FIG. 12A indicates that as long as the stencil is in this state nothing happens.

A cyclic watch job executor is running in a separate thread that executes control table watch jobs, for example in a cyclic manner at some number of milliseconds of separation. A watch job queries the database table to detect if the row of a stencil has been changed since the last time the job was called.

At 1106, if the watch job detects a change in a stencil X, such as from STOPPED to STARTED, it can forward this transition information to a control transition handler. Here, starting the stencil "example" can be triggering by executing the following SQL query:

```
update "SYSTEM"."INTEGRATION_CONTROL_TABLE" set
CONTROL = 'START' where ID = 'example';
```

At 1108, components can subscribe, from the control transition handler, to transitions they are interested in. For example, when the transition from STOPPED to STARTED was detected, the transition handler can request the stencil controller to start this stencil.

At 1110, to start a given stencil, the stencil controller can create a new controller for the stencil that has the same logic as in the previous two steps. If no database table exists for this stencil, a table can be created that includes one column for each configuration point of the stencil. FIG. 12B shows that the table "INTEGRATION_EXAMPLE" is created that has configuration points "FROM_DIRECTORY" and "TO_DIRECTORY".

At 1112, the stencil controller start/stops the Camel context that is assigned to a given stencil when a transition from STOPPED to STARTED is detected. For example, one stencil always has exactly one Camel context. If the stencil is successfully started the state of the control table is updated. FIG. 12C shows that the state is changed from STOPPED to STARTED.

Given that a row is inserted in the stencil table of a given stencil, the stencil controller will create a new route inside the Camel context of the stencil, and start or stop the route according to the control state. At 1114, the route is reconfigured accordingly when the parameters in the row are updated. For example, when the following SQL statement is executed, two new routes are created that move files from folder "foo" to folder "bar", and from folder "foobar" to folder "foobarbar":

```
insert into "SYSTEM"."INTEGRATION_EXAMPLE"
values('firstInstance','STOPPED','foo','bar');
insert into "SYSTEM"."INTEGRATION_EXAMPLE"
values('secondInstance','STOPPED','foobar','foobarbar')
```

However, FIG. 12D indicates that the route is not active because it is in the state STOPPED.

Figure 12E:
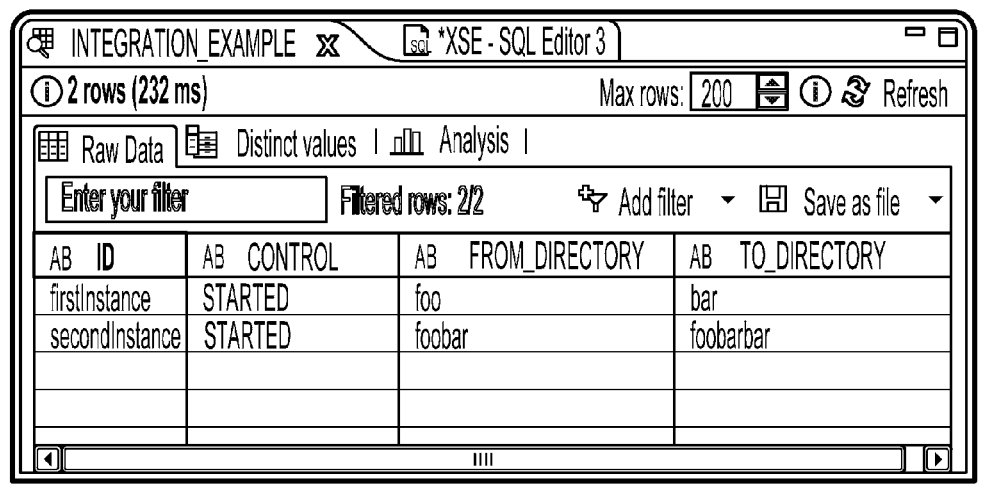

To start the routes, the control value must be started, for example by executing the following SQL statement:
update "SYSTEM"."INTEGRATION_EXAMPLE" set CONTROL='START';

The routes are then started and activated by the route controller. Now the system successfully moves the files in folder "foo" to the folder "bar" and the files in the folder "foobar" to the folder "foobarbar". FIG. 12E indicates that the stencil instances are running by the STARTED control state. New routes to move files from an arbitrary folder X to another arbitrary folder Y can be added by adding additional rows to the stencil table.

Figure 13:
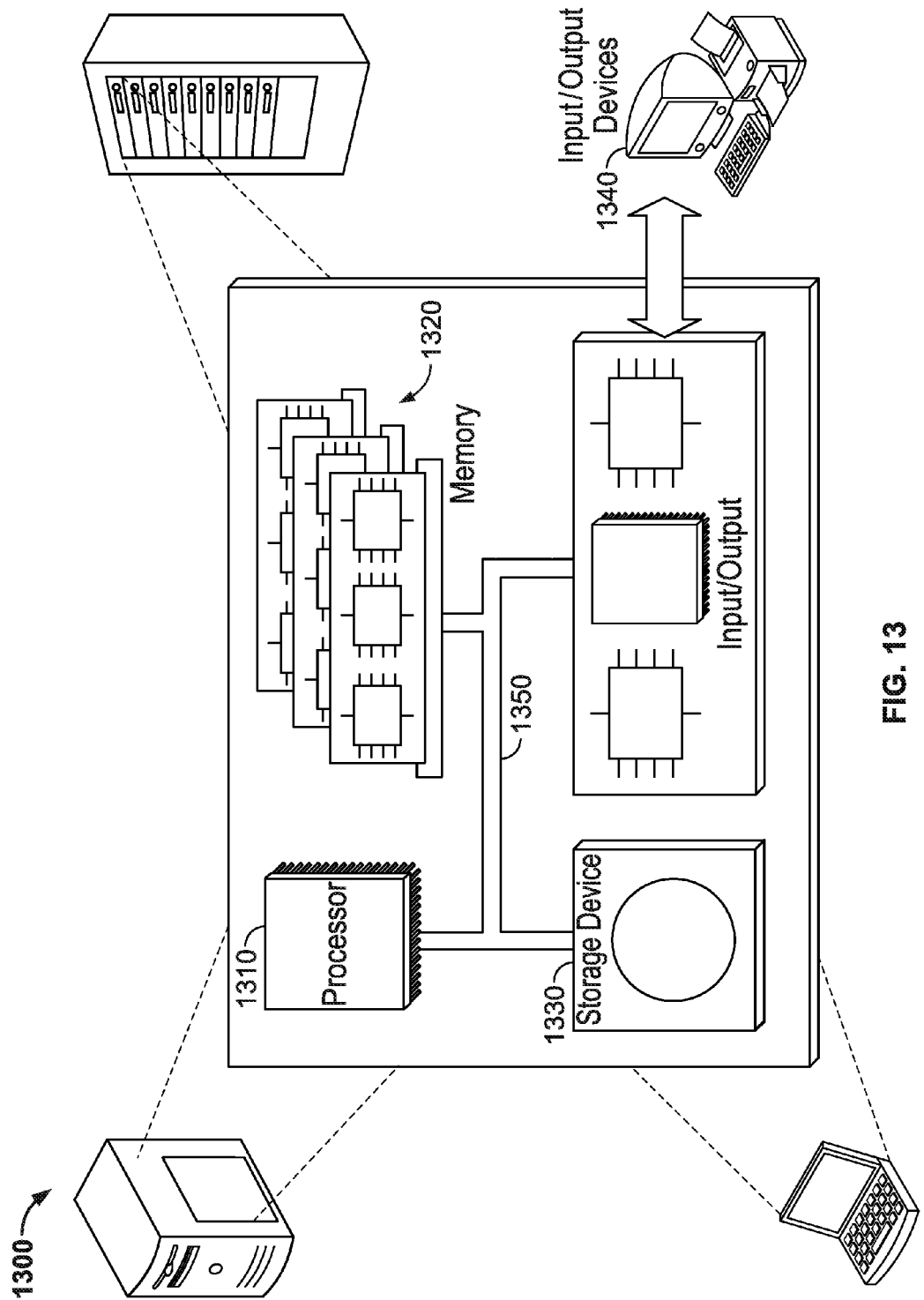
FIG. 13 is a block diagram of a computing system that can be used in connection with computer-implemented methods described in this document.

FIG. 13 is a schematic diagram of a generic computer system 1300. The system 1300 can be used for the operations described in association with any of the computer-implement methods described previously, according to one implementation. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In some implementations, the memory 1320 is a computer-readable medium. The memory 1320 is a volatile memory unit in some implementations and is a non-volatile memory unit in other implementations.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for configuring integration capabilities for system integration, the method comprising:
    receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point;
    receiving, using one or more processors, input comprising at least one configuration point value for the configuration point, the configuration point value having been selected based on first and second systems to be integrated using the message flow;
    determining whether the received configuration point value violates the constraint and if so requesting another configuration point value from the input; and
    generating a configuration stencil instance based on the configuration stencil and the input, the configuration stencil instance representing the message flow in an integration of the first and second systems.

2. The computer-implemented method of claim 1, further comprising generating the configuration stencil from one or more existing routes.

3. The computer-implemented method of claim 2, wherein generating the configuration stencil comprises
    pre-processing the one or more existing routes;
    identifying integration artifacts and content;
    deriving the at least one constraint from the identified content;
    identify and parse the at least one configuration point;
    performing analysis and apply the at least one constraint; and
    replacing one or more concrete values with the at least one configuration point and deploy the configuration stencil.

4. The computer-implemented method of claim 1, further comprising performing lifecycle management of the configuration stencil including versioning.

5. The computer-implemented method of claim 1,
    wherein the configuration stencil provides for monitoring of the message flow;
    wherein the configuration stencil corresponds to a design-time model in which one configuration stencil node defines one or more configuration point nodes, the design-time model providing for the configuration point node to be connected to a configuration constraint node;
    wherein a monitoring point node is connected to the configuration stencil node in the design-time model, the monitoring point node having a monitoring point specification;
    wherein the configuration stencil instance corresponds to a runtime model in which a stencil instance node is an instance of the configuration stencil node, a configuration point value node is a value for the configuration point node, the runtime model providing for the configuration point value node to be connected to a configuration point type value node; and
    wherein a monitoring point value node is a value for the monitoring point node, and a monitoring point query node is a value for the monitoring point specification.

6. The computer-implemented method of claim 1, wherein the first system is a sales system and the second system is a customer relationship management (CRM) system, and wherein the configuration stencil instance configures the message flow for a business partner object in the CRM system and another configuration stencil instance generated from the configuration stencil configures a business partner relationship object in the CRM system.

7. The computer-implemented method of claim 1, further comprising providing a graphical user interface that identifies the configuration stencil, provides a first input control for generating one or more new configuration stencil instances, and provides at least a second input control for managing a lifecycle of the generated new configuration stencil instance.

8. A computer program product embodied in a non-transitory computer-readable storage medium and comprising instructions that when executed by a processor perform a method comprising:
    receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point;
    receiving, using one or more processors, input comprising at least one configuration point value for the configuration point, the configuration point value having been selected based on first and second systems to be integrated using the message flow;
determining whether the received configuration point value violates the constraint and if so requesting another configuration point value from the input; and
generating a configuration stencil instance based on the configuration stencil and the input, the configuration stencil instance representing the message flow in an integration of the first and second systems.

9. The computer program product of claim 8, the method further comprising generating the configuration stencil from one or more existing routes.

10. The computer program product of claim 9, wherein generating the configuration stencil comprises
pre-processing the one or more existing routes;
identifying integration artifacts and content;
deriving the at least one constraint from the identified content;
identify and parse the at least one configuration point;
performing analysis and apply the at least one constraint; and
replacing one or more concrete values with the at least one configuration point and deploy the configuration stencil.

11. The computer program product of claim 8, the method further comprising performing lifecycle management of the configuration stencil including versioning.

12. The computer program product of claim 8,
wherein the configuration stencil provides for monitoring of the message flow;
wherein the configuration stencil corresponds to a design-time model in which one configuration stencil node defines one or more configuration point nodes, the design-time model providing for the configuration point node to be connected to a configuration constraint node;
wherein a monitoring point node is connected to the configuration stencil node in the design-time model, the monitoring point node having a monitoring point specification;
wherein the configuration stencil instance corresponds to a runtime model in which a stencil instance node is an instance of the configuration stencil node, a configuration point value node is a value for the configuration point node, the runtime model providing for the configuration point value node to be connected to a configuration point type value node; and
wherein a monitoring point value node is a value for the monitoring point node, and a monitoring point query node is a value for the monitoring point specification.

13. The computer program product of claim 8, wherein the first system is a sales system and the second system is a customer relationship management (CRM) system, and wherein the configuration stencil instance configures the message flow for a business partner object in the CRM system and another configuration stencil instance generated from the configuration stencil configures a business partner relationship object in the CRM system.

14. The computer program product of claim 8, the method further comprising providing a graphical user interface that identifies the configuration stencil, provides a first input control for generating one or more new configuration stencil instances, and provides at least a second input control for managing a lifecycle of the generated new configuration stencil instance.

15. A system comprising:
one or more processors; and
a computer program product embodied in a non-transitory computer-readable storage medium and comprising instructions that when executed by a processor perform a method comprising:
receiving, using one or more processors, a configuration stencil that is a configuration artifact of a message flow, the configuration stencil comprising at least one configuration point, the configuration point currently having no assigned value, and at least one constraint for the configuration point, the constraint being a rule or type for a value to be assigned to the configuration point;
receiving, using one or more processors, input comprising at least one configuration point value for the configuration point, the configuration point value having been selected based on first and second systems to be integrated using the message flow;
determining whether the received configuration point value violates the constraint and if so requesting another configuration point value from the input; and
generating a configuration stencil instance based on the configuration stencil and the input, the configuration stencil instance representing the message flow in an integration of the first and second systems.

16. The system of claim 15, the method further comprising generating the configuration stencil from one or more existing routes.

17. The system of claim 16, wherein generating the configuration stencil comprises
pre-processing the one or more existing routes;
identifying integration artifacts and content;
deriving the at least one constraint from the identified content;
identify and parse the at least one configuration point;
performing analysis and apply the at least one constraint; and
replacing one or more concrete values with the at least one configuration point and deploy the configuration stencil.

18. The system of claim 15,
wherein the configuration stencil provides for monitoring of the message flow;
wherein the configuration stencil corresponds to a design-time model in which one configuration stencil node defines one or more configuration point nodes, the design-time model providing for the configuration point node to be connected to a configuration constraint node;
wherein a monitoring point node is connected to the configuration stencil node in the design-time model, the monitoring point node having a monitoring point specification;
wherein the configuration stencil instance corresponds to a runtime model in which a stencil instance node is an instance of the configuration stencil node, a configuration point value node is a value for the configuration point node, the runtime model providing for the configuration point value node to be connected to a configuration point type value node; and
wherein a monitoring point value node is a value for the monitoring point node, and a monitoring point query node is a value for the monitoring point specification.

19. The system of claim 15, the method wherein the first system is a sales system and the second system is a customer relationship management (CRM) system, and wherein the configuration stencil instance configures the message flow for a business partner object in the CRM system and another configuration stencil instance generated from the configuration stencil configures a business partner relationship object in the CRM system.

20. The system of claim 15, the method further comprising providing a graphical user interface that identifies the configuration stencil, provides a first input control for generating one or more new configuration stencil instances, and provides at least a second input control for managing a lifecycle of the generated new configuration stencil instance.

* * * * *